(12) United States Patent
Anderson

(10) Patent No.: US 6,659,196 B1
(45) Date of Patent: Dec. 9, 2003

(54) CORE ORIENTATION

(75) Inventor: Leslie Michael Anderson, Milthorpe (AU)

(73) Assignee: Shelljet PTY Limited, New South Wales (AU)

(*) Notice: Subject to any disclaimer, the term of this patent is extended or adjusted under 35 U.S.C. 154(b) by 0 days.

(21) Appl. No.: 09/980,426

(22) PCT Filed: Jun. 5, 2000

(86) PCT No.: PCT/AU00/00627

§ 371 (c)(1),
(2), (4) Date: Mar. 22, 2002

(87) PCT Pub. No.: WO00/75480

PCT Pub. Date: Dec. 14, 2000

(30) Foreign Application Priority Data

| Jun. 3, 1999 | (AU) | ............................................... PQ 0742 |
| Dec. 29, 1999 | (AU) | ............................................... PQ 4950 |
| Mar. 21, 2000 | (AU) | ............................................... PQ 6402 |

(51) Int. Cl.⁷ ............................................... E21B 25/16
(52) U.S. Cl. ............................... 175/44; 33/304; 33/305; 33/308
(58) Field of Search .......................... 175/44, 58, 244, 175/249; 33/302, 304, 305, 308

(56) References Cited

U.S. PATENT DOCUMENTS

| 2,313,576 A | * | 3/1943 | Phillips et al. ................. 175/44 |
| 2,600,125 A | * | 6/1952 | Natland et al. ................ 175/44 |
| 2,657,013 A | * | 10/1953 | Brady ........................... 175/44 |
| 2,670,179 A | * | 2/1954 | Natland et al. ................ 175/41 |
| 2,735,652 A | * | 2/1956 | Brady ........................... 175/44 |
| 3,059,707 A | * | 10/1962 | Frisby ........................... 175/44 |
| 3,115,196 A | * | 12/1963 | Roxstrom ...................... 175/44 |

FOREIGN PATENT DOCUMENTS

AU          240221          11/1962

OTHER PUBLICATIONS

*Archway Corientator System*, "Orientates cores while drilling, with zero rig downtime" Brochure, Archway Engineering (U.K) Ltd. (Undated).

* cited by examiner

Primary Examiner—David Bagnell
Assistant Examiner—Matthew J Smith
(74) Attorney, Agent, or Firm—Woodcock Washburn LLP

(57) ABSTRACT

An upper end (10) for the inner tube of a core drill has a marking device comprising a pendulum (350) or hard ball (30) which runs in a circumferential track (24). The marking device adapted to be carried within a tubular upper end casing (12) which surrounds a spindle (11) which supports the inner tube of the drill. An indent washer (25) is positionable below the marking device and is oriented relative to the casing. When the upper end (10) is lifted, the marking device is driven into contact with the washer (25) and makes an impression. The orientation of the impression reveals the orientation of the drill. The impressioned washer (25) can be used to assist in noting or marking the core orientation after the drill is removed from the earth.

24 Claims, 11 Drawing Sheets

CORE ORIENTATION

FIELD OF THE INVENTION

This invention relates to core drilling and more particularly to apparatus and methods for determining the original orientation of a core sample after it has been drilled, separated and pulled out of the earth.

BACKGROUND ART

Many forms of geological survey depend on core drilling for samples. Some surveying requires that the orientation of a core be determined accurately and reliably. In many situations the angle of the longitudinal axis of the core drill relative to the "plane" of the earth at the drill site is other than 90 degrees. This is the drilling angle and it may be ascertained in a number of ways. It is sometimes also important to determine, after removing the core for inspection, the rotational orientation or compass orientation of the core sample relative to the surrounding terrain from which it was extracted. Known prior methods are not reliable, particularly at low angles of inclination from the vertical.

SUMMARY OF THE INVENTION

It is an object of the invention to provide an apparatus for use with core drilling devices which includes a hard ball which runs in a circumferential track. The ball and track are adapted to be carried within a tubular upper end casing, which surrounds the spindle which supports the inner tube of the drill. An indent washer is positionable above the track and ball and is oriented relative to the casing. A spring supports the washer above the ball. When the upper end is lifted, the ball is driven into contact with the washer and makes an impression. The orientation of the impression reveals the orientation of the lowest point in the track. The impressioned washer can be used to assist in noting or marking the core orientation after the drill is removed from the earth.

In one preferred embodiment of the invention, the washer is formed with an alignment hole. The upper end casing supports a pin which extends in the direction of the drill rotational axis. The pin passes through the hole to maintain the washer in a fixed alignment with the casing.

In another embodiment of the invention the spindle is split into upper and lower segments, the lower segment having a flange which bears on thrust bearings.

In another embodiment of the invention, a laser pointer system is used to transfer orientation information to a core which has been drilled in conjunction with a ball, track and washer device as disclosed with reference to the present invention.

It is yet another object of the invention to provide an apparatus for use with core drilling devices which includes a pendulum and backing plate which together form a ball and socket joint. The pendulum terminates in the joint which makes an impression in the indent washer having a known orientation.

A core drill usually comprises and outer tube and an inner tube. The outer tube is rotated and transmits rotational power to a cutting head. A drill bit on the cutting head forms a core which rises up through the inner tube as the drill progresses into the earth or substrate. The inner tube and separated core may be lifted up through the outer tube by lowering a latching body through the outer tube and latching onto a spindle carried by the upper end of the inner tube. The latching body is lowered on a steel cable and engages the upper end of the spindle. Tension on the rod string is translated, by a core lifter within the drill, into a compressive force which acts to fracture the core and separate it from the substrate. The separated core can then be lifted, within the inner tube, by the cable attached to the upper end.

The present invention has been devised to create a valuable and accurate record of the compass orientation of the core at the moment of separation.

Figure 1:
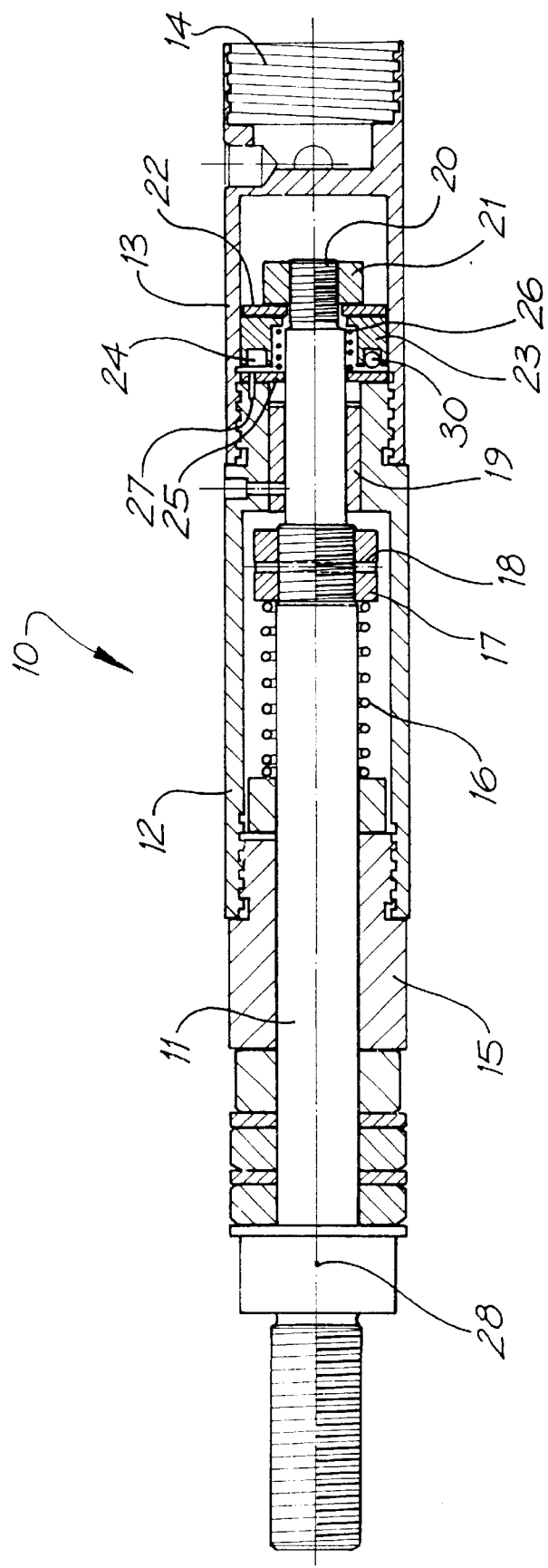
FIG. 1 is a cross section of an upper end of a core drill inner tube.

As shown in FIG. 1, an upper end 10 includes a spindle 11 a casing 12 and a shield 13. Threads 14 at the lower end of the shield engage the upper threads of the inner tube of the core drill. The spindle 11 passes through the plug 15 which caps the top of the casing 12. A compression spring 16 is trapped between the plug 15 and a nut 17 which is threaded on to the spindle 11 and secured thereto by pin 18. The lower end of the spindle 11 passes through a bronze bushing 19 and terminates in a threaded stub 20.

Figure 2:
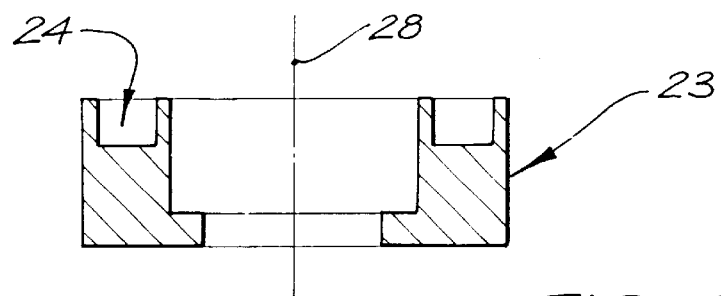
FIG. 2 is a cross section of the track.
Figure 8:
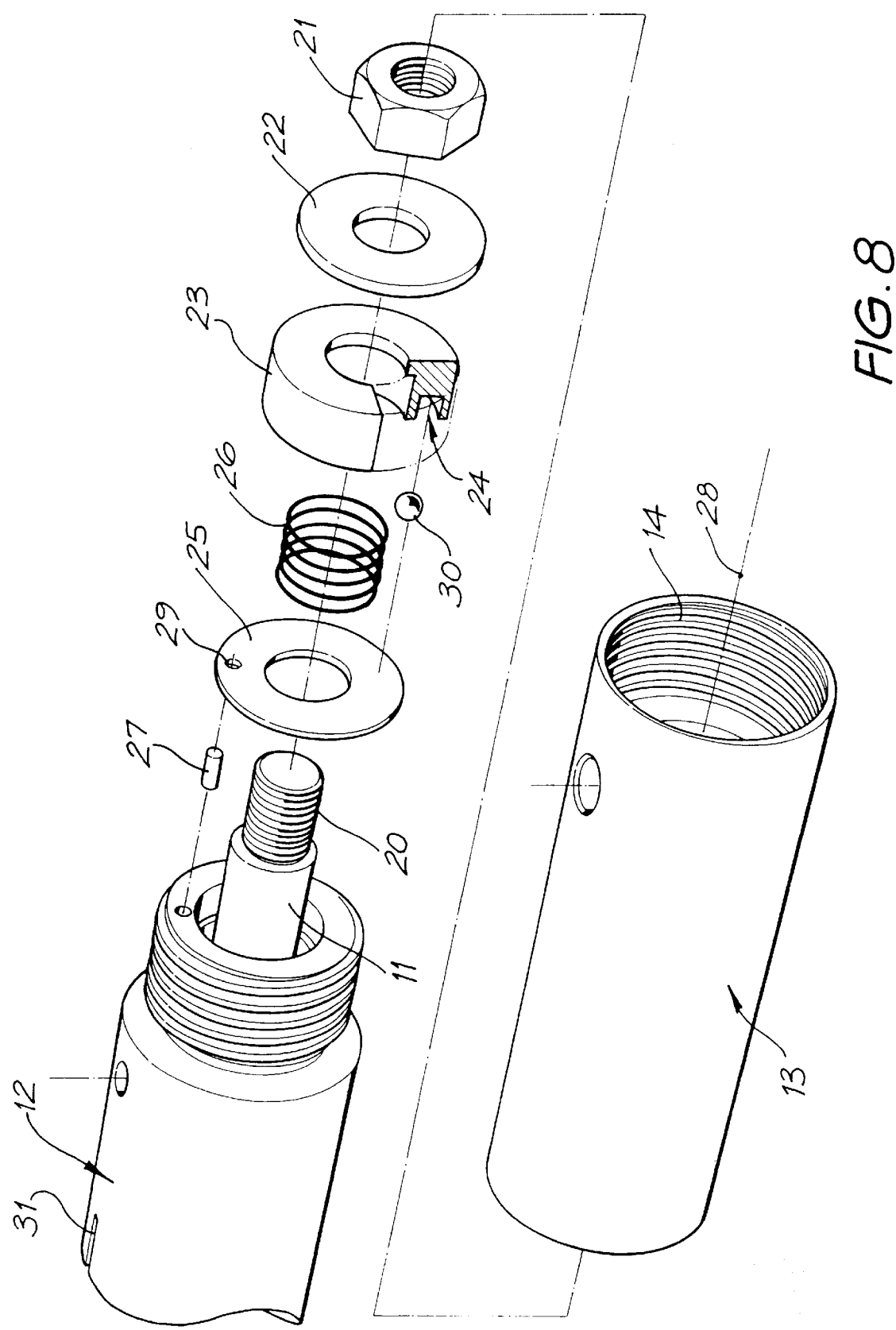
FIG. 8 is an exploded perspective view showing the ball, track and indent washer.
Figure 10:
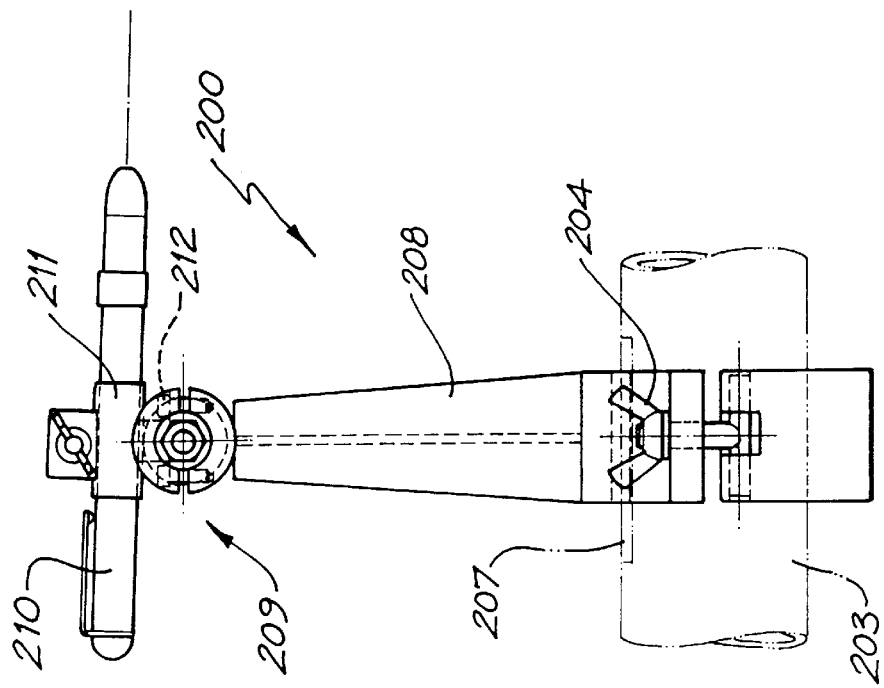
FIG. 10 is a side view of the device depicted in FIG. 9. A laser pointer is held by the device.

When the rod string is raised, the spindle 11 is placed into tension. As shown in FIGS. 1 and 8, this causes a nut 21 threaded onto the stub 20, to bear against a washer 22 and consequently onto a track 23. The track 23 surrounds the spindle 11 and faces upwardly or away from the threads 14. A groove 24 is formed in an upper face of the track. The groove 24, when the track is installed, also surrounds the spindle 11. An indent washer 25 is positioned between the track 23 and the lower end of the casing 12. A non-magnetic steel or other non-metallic hard ball 30 rolls freely in the groove. The diameter of the ball is slightly larger than the depth of the groove 24. In all non-vertical drilling, the track 23 is tilted. When the track is tilted, as in the case of non-vertical drilling, the ball rolls to the lowest point in the plane of the groove 24. The track 23 is shown in FIG. 2.

Figure 3:
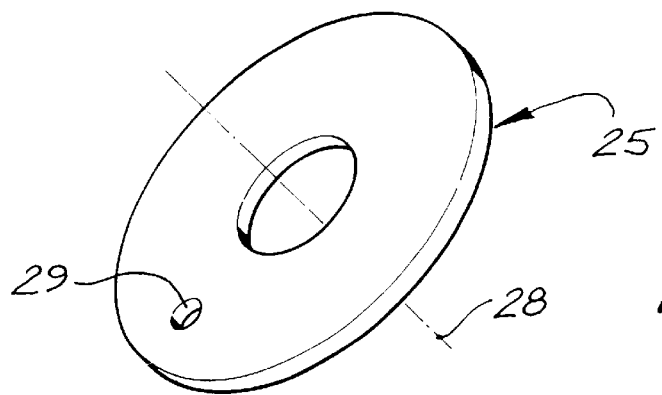
FIG. 3 is a perspective view of the indent washer.

Until the track 23 is brought into the proximity of the lower end of the casing, the indent washer 25 and the track 23 are kept apart by a spring 26. The spring keeps the indent washer 25 in contact with the lower end of the casing 12. The indent washer 25 (shown in FIG. 3) is formed from a relatively soft metal such as copper or brass that can be impressed or indented with a steel ball. The indent washer has a central opening for receiving the spindle 11 and an alignment hole or pilot 29.

Figure 4:
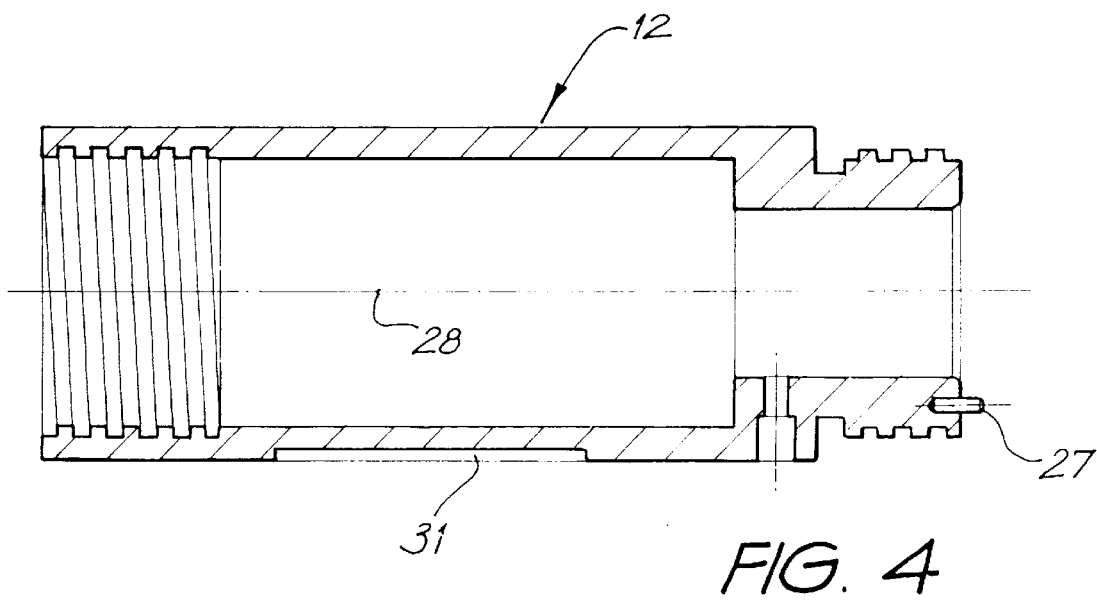
FIG. 4 is a cross section of the casing of the upper end.

As shown in FIG. 4, the lower end of the casing is fitted with a pin 27. The pin 27 extends in the direction of the drilling axis 28 and extends into the pilot or hole 29 formed in the indent washer 25. This keeps the rotational or compass orientation of the indent washer 25 indexed or fixed, relative to the casing 12. The pin 27 does not interfere with the rolling of the ball in the groove.

When a core is being separated by raising the rod string, the spring 26 compresses as the track 23 is brought toward the indent washer 27. Before contact, the ball 30 has rolled to the lowest point in the groove 23. Eventually, the ball becomes trapped between the track 23 and the indent washer 25. Further tension in the rod string causes the ball 30 to be driven into the surface of the indent washer 25. This action makes an impression or indent in the washer 25 and the indent is known to be formed at the time the core is separated. When the drill is other than absolutely vertical, the angular (or "compass") position of the impression marks the bottom or lowest (vertical) point in the groove 24 and therefore in the plane of the washer 25. Both the groove 24 and the washer 25 are perpendicular to the long axis of the drill.

Because the indent washer 25 is pinned to the casing, its orientation relative to the casing is known. Thus, the impression can later be related to a reference mark or groove 31 formed on the outer surface of the casing. This is shown in FIG. 5.

Figure 5:
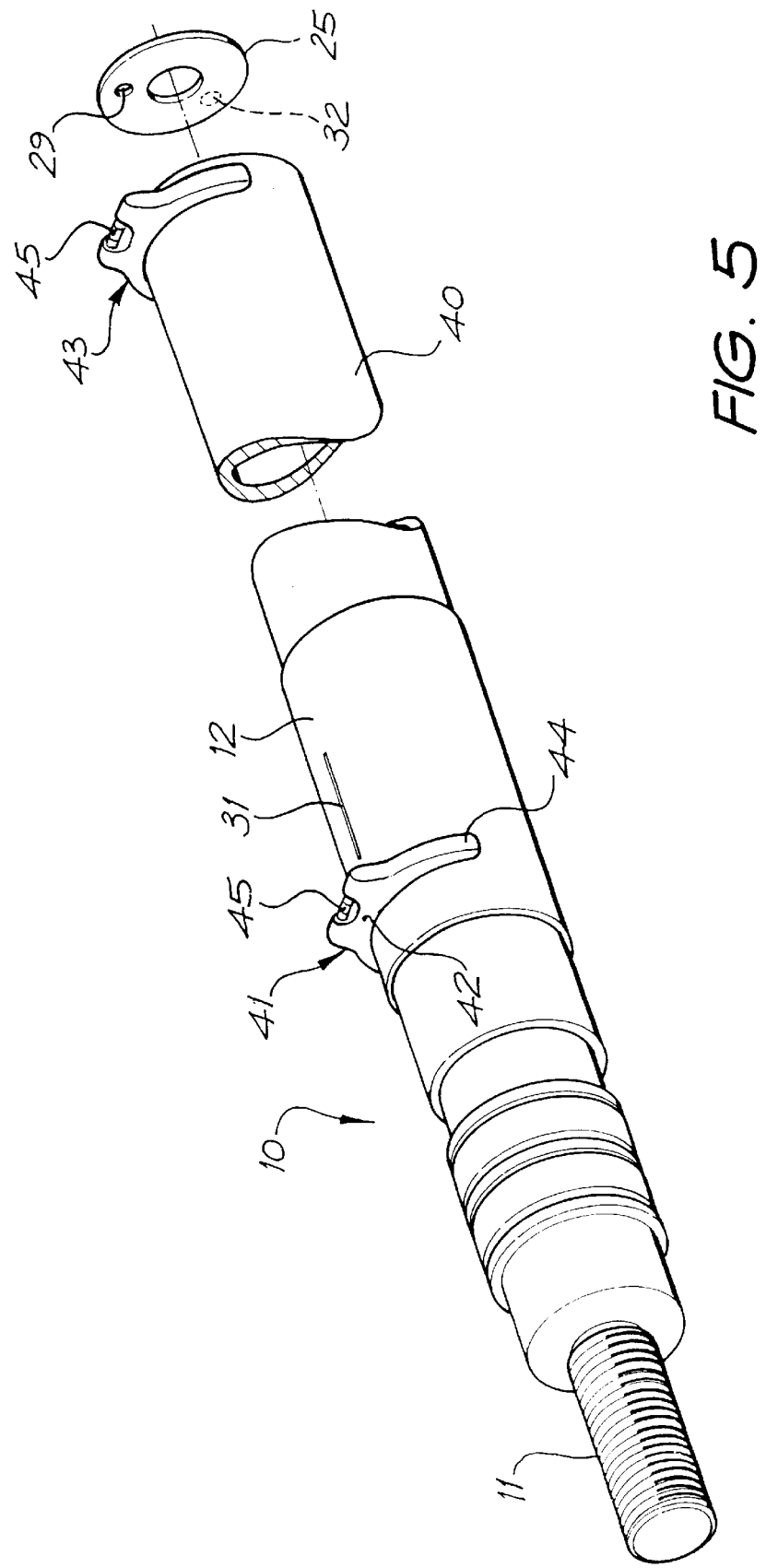
FIG. 5 is a perspective view of an inner tube and upper end, showing the use of the levels and indent washer in marking the core.

FIG. 5 show how the core's orientation is determined. In this example, the pin 27 and reference groove or mark 31 are aligned during the manufacture of the casing 12. To be exact, the reference mark defines a plane through the drill axis 28. Preferably and conveniently, the pin is formed in this plane (on the same side of the centreline 28 as the mark 31). The pin and reference mark 31 need not be in the same plane so long as the angular relationship of the two different planes is known. This relationship allows the location of the alignment hole 29 in the indent washer 25 to be related to the location of the reference mark 31.

This means that the indent washer 25 can be removed after drilling and the indent washer 25 can be used to mark the bottom or low point of the core. This is done by laying the re-assembled top end 10 and inner tube 40 horizontally and rotating them together until the reference mark 31 faces straight up. To do this, a specially adapted level 41 is used.

The level is in the form of a saddle 44 which conforms to the circumference of the upper end 10. The level includes a central reference mark 42. A spirit level or other levelling device 45 attached to the saddle indicates when the reference mark 42 is at its vertical maximum. When the reference mark 42 is at its maximum and also aligned with the reference mark 31 on the casing 12, the reference mark 31 is known to be in a vertical plane which passes through the drill axis 28. Next, the same or a second level 43 is used to note the vertical maximum of the lower end of the inner tube 40 and therefore of the core sample within. By aligning the hole 29 of the indent washer 25 with the indicated vertical maximum of the lower end of the inner tube 40, the impression 32 can be used to indicate where to mark an index point onto the core.

The index point indicates the location of the "bottom" of an inclined slice of the core sample. It should be apparent that an imaginary line which passes radially from the drill axis 28 through the index point defines the compass orientation of the core. This is because the inclination of the drill axis in the earth can be related to a compass direction. This may be done before, during or after drilling by observing the compass orientation of the vertical plane which contains the drill axis 28 at the cutting head at the time when the core is separated.

Figure 6:
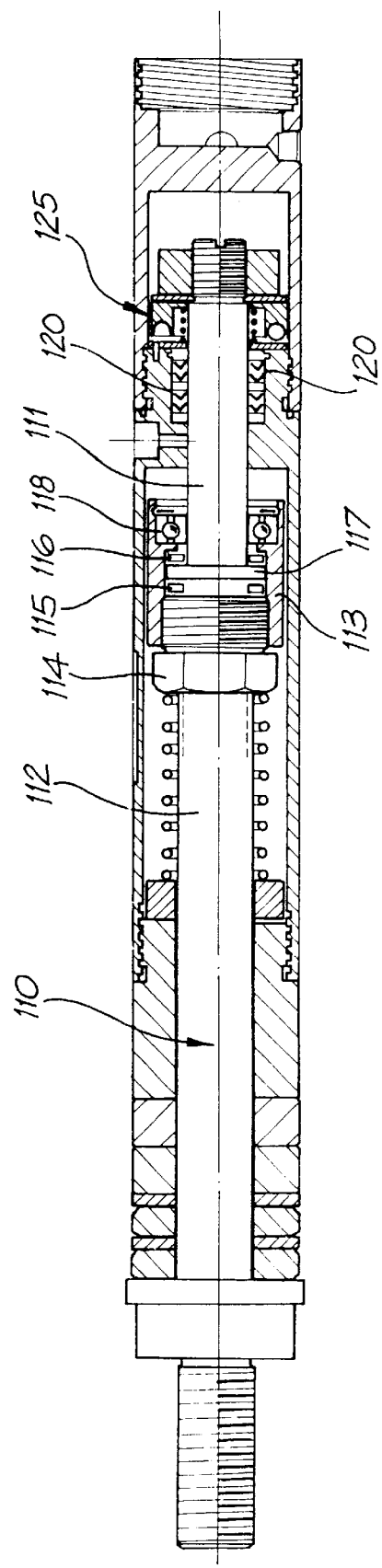
FIG. 6 is a cross section of another embodiment of the invention.
Figure 7:
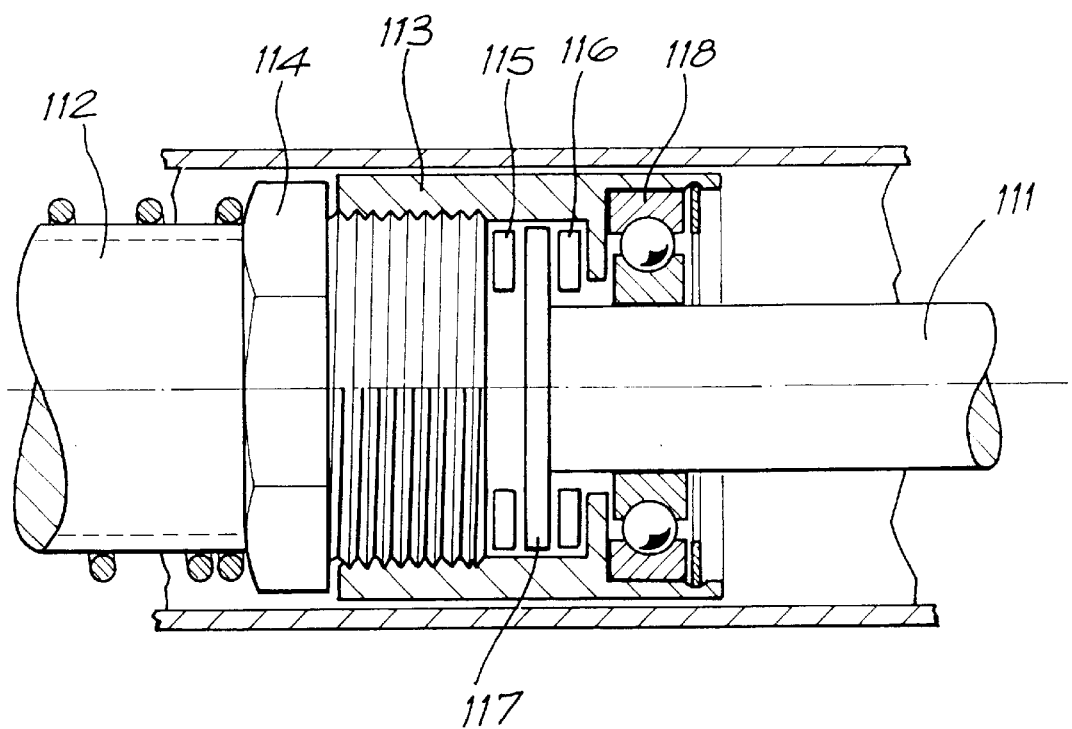
FIG. 7 is an enlarged view of the coupling portion of the embodiment shown in FIG. 6.

In order to minimise wear on the bushing 19 an alternate embodiment of the invention is contemplated. As shown in FIG. 6, the spindle 110 is split so that the lower portion 111 of the spindle rotates independently of the upper portion 112 of the spindle. Tension is transmitted from the upper portion 112 to the lower portion 111 by a coupling 113. The coupling 113 is at one end threaded to a lock nut 114 and serves to restrain the lower portion of the spindle 111 between a pair of thrust bearings 115, 116. The lock nut 114 is threaded onto the bottom end of the upper spindle 12 and has a threaded exterior to engage the coupling 113.

The lower portion of the spindle 111 carries an integral flange 117 which is trapped by the coupling but which rotates freely within it. Ball bearings 118 support the lower portion 111 within the coupling 113. The coupling arrangement allows the lower portion 111 to rotate independently of the upper portion 112. This arrangement minimises the rotation of the lower portion 111 and minimises wear on the seals 120, preferably two in number, which seals prevent grease, water and mud from interfering with the operation of the track, ball and washer arrangement 125.

Figure 9:
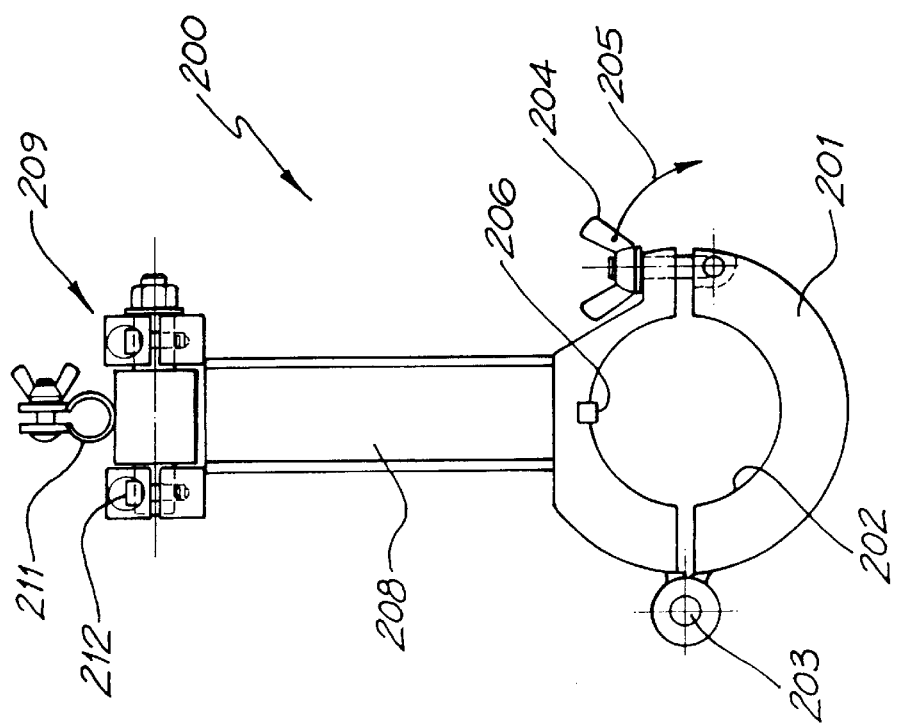
FIG. 9 is a front elevation showing an alignable laser stand and clamp.

In order that orientation information can be more efficiently transferred to the core sample, an optional laser pointer system is provided (see FIGS. 9–14). As shown in FIG. 9, the laser pointer system includes a laser mount 200. The mount 200 includes a tube clamp 201. The inside diameter 202 of the tube clamp 201 is adapted to encircle an outer circumference of an outer tube 203 (see FIG. 10). The clamp 201 also includes an exterior hinge 203 and a tensionable fastener 204. When the fastener 204 is loosened, it may swing out of position (see arrow) 205 for facilitating installation and removal from the tube 203. The inside diameter 202 of the clamp 201 also includes a key 206 which is adapted to fit into the alignment groove 207 which is formed on the exterior of the tube 203. The laser mount 200 further includes a pedestal 208 which extends from the clamp 201 to an adjustable pivoting laser retainer 209. The retainer 209 is affixed to the pedestal 208 and allows for vertical only adjustment of the beam produced by the laser pointer 210. The pointer 210 is held by a second clamp 211 which is adapted to allow easy insertion and removal of the pointer 210.

The laser pointer system may be utilised once a core drilling operation has been completed, and the core has been broken and removed from the drill hole. The tube is removed as usual and placed on a horizontal rack. The tube 203 is placed on the rack in a position where the groove 207 in the back end is facing up. The laser mount 200 is then positioned over the groove with the key 206 located in the groove 207. The mount is then locked in place with the fastener 204. The laser beam is adjusted in the vertical plane owing to the adjustability of the retainer 209. The laser is manipulated until the dot of light produced by the laser (usually red) impinges on the core or the end of the core lifter case as required. The fasteners 212 on the retainer are then tightened thereby securing the laser pointer in position.

Figure 11:
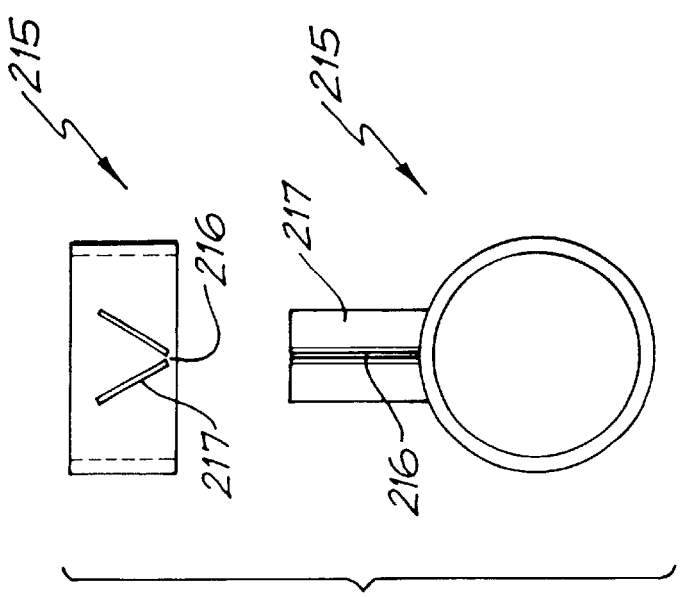
FIG. 11 is a laser mask or image intensifier which is used in combination with a laser pointer according to the teachings of the invention.
Figure 13:
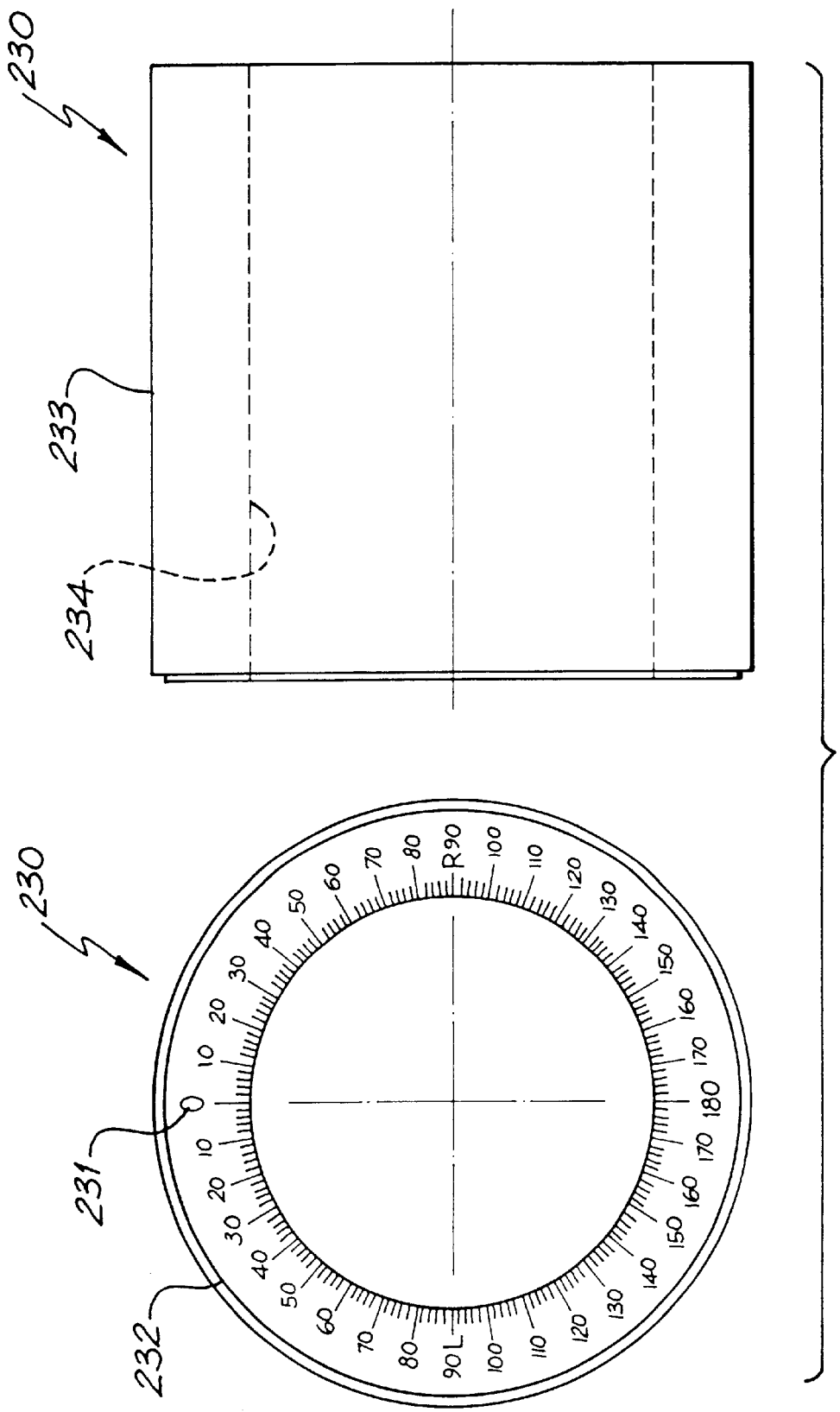
FIG. 13 illustrates a front elevation and a side elevation of a core reader.
Figure 14:
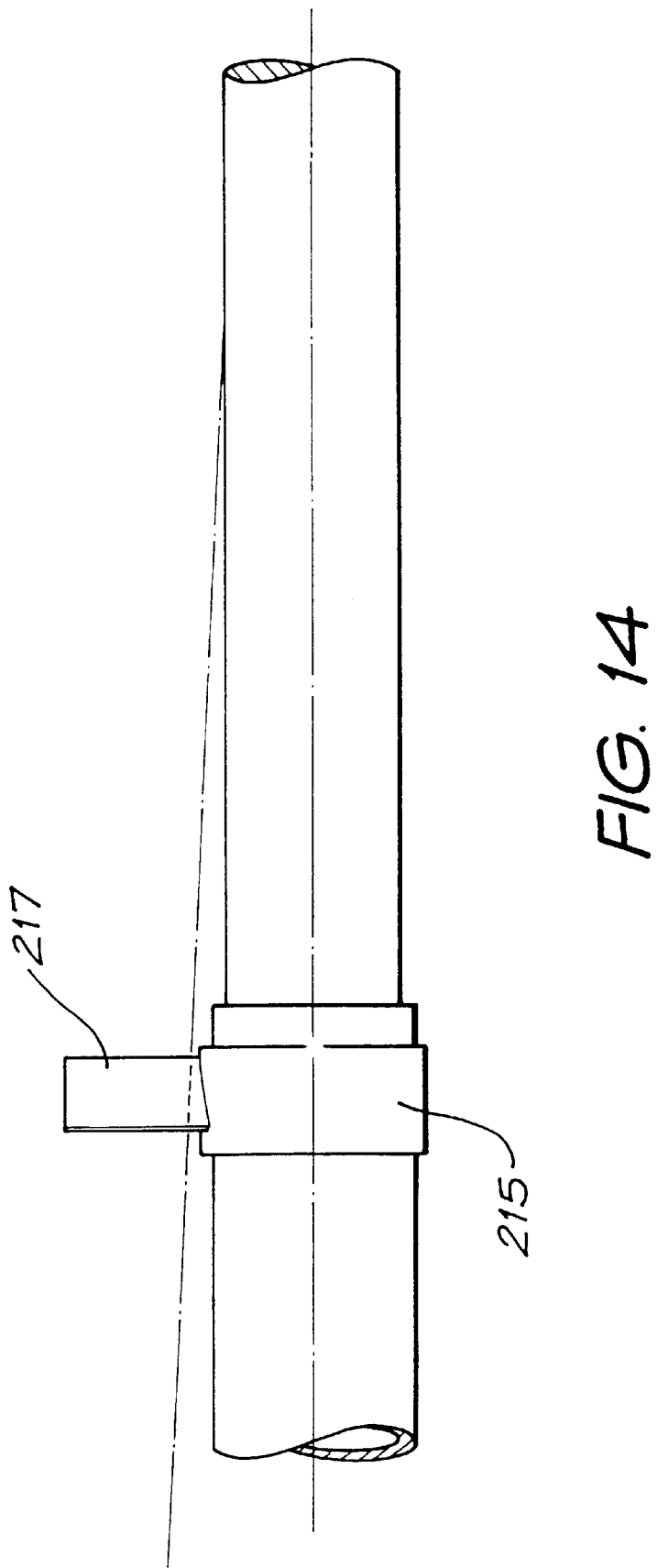
FIG. 14 illustrates laser assisted marking of a core sample.

Next, an image intensifier or mask 215 as illustrated in FIG. 11 is slid over the lifter case and lined up with the centre of the laser dot. Because the slot 216 in the V-shaped mask 217 is narrower than the diameter of the laser dot, a thin line of laser light will appear on the core or core lifter case. The laser light exiting the image intensifier 215 corresponds with the location of the index groove 207 and with the hole 29 in the indent washer 25 (so long as the relationship between the index groove 207 and pin 27 is known). Using a sharp pencil a thin mark is placed on the core where indicated by the line of laser light as shown in FIG. 14.

Next, the core is removed from the tube and placed on a tray or marking rack. Then, the indent washer is removed from the drilling apparatus. A measurement is then made of the angle between the washer's alignment hole 29 and the indent mark (for example 32). This may be conveniently achieved using a measuring device of the type illustrated in FIG. 12.

Figure 12:
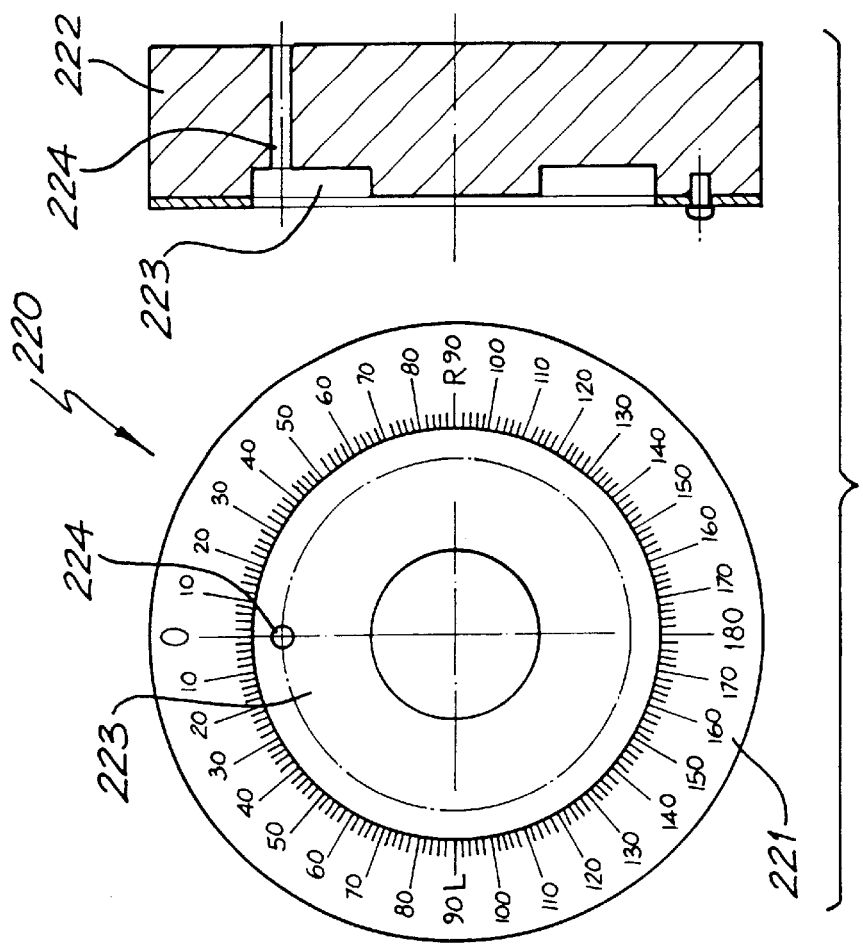
FIG. 12 illustrates a front elevation and a cross-section of a disc reader.

As shown in FIG. 12, the disc reader 220 preferably includes a measurement ring 221 affixed to a disc-like base 222. The washer fits within the central opening 223 of the ring 221 and may optionally be supported by the base 222. When the hole 29 of the washer 25 is aligned with the hole 224 of the reader 220, the angular displacement of the indent 32 can be read directly from the measuring ring 221.

Next a core reader 230 (shown in FIG. 13) is placed over the end of the core. The zero mark 231 is oriented with respect to the line or impression made by using the laser pointer on the core. Using the measurement produced by the disc reader 220 the angular displacement of the indentation can then be marked or transferred directly onto the core using the measurement ring 232 of the core reader 230. Note that the measuring ring 232 of the core reader 230 is affixed to a cylinder 233 whose inside diameter 234 is adapted to slide over the core.

Figure 15:
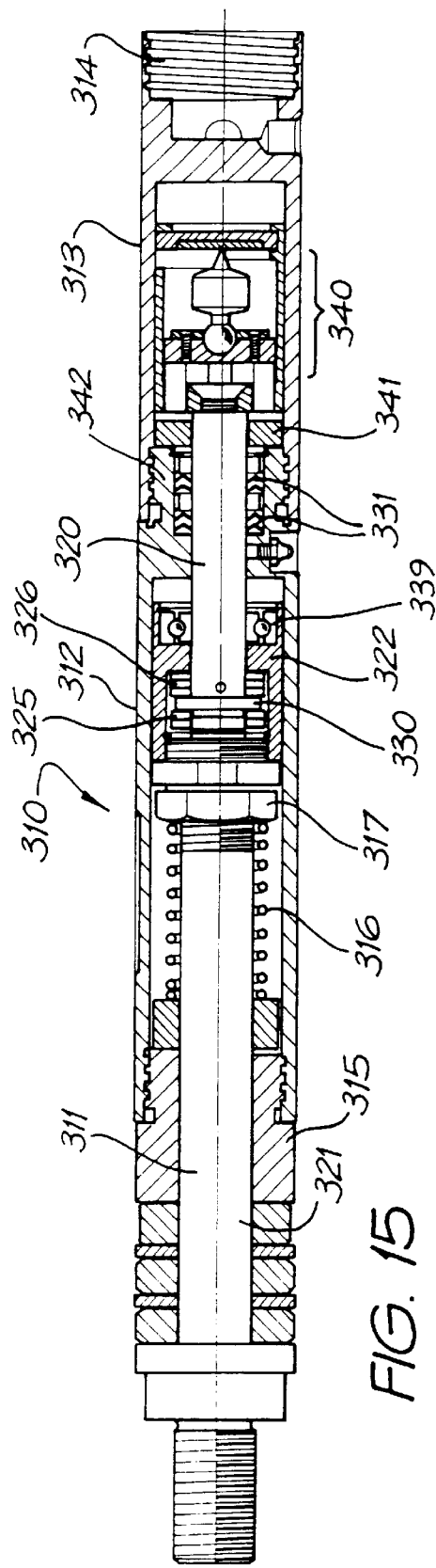
FIG. 15 is a cross section of an upper end of a core drill inner tube.
Figure 16:
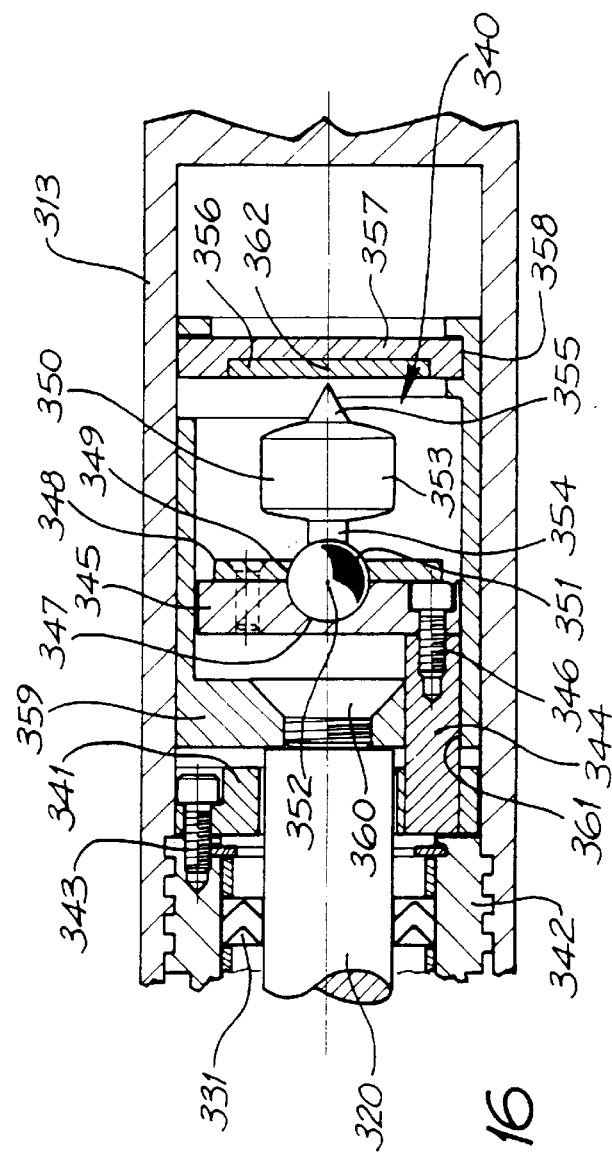
FIG. 16 is a cross section of the pendulum arrangement and disk.

Another embodiment of the invention is depicted in FIGS. 15 and 16, this embodiment ups the type of indent washer previously described. In order to cope with low angles of inclination from the vertical, a pendulum is used.

As shown in FIG. 15, an upper end 10 includes a spindle 311 a casing 312 and a shield 313. Threads 314 at the lower end of the shield engage the upper threads of the inner tube of the core drill. The spindle 311 passes through the plug 315 which caps the top of the casing 312. A compression spring 316 is trapped between the plug 315 and a nut 317 which is threaded on to the spindle 311 and secured thereto by pin (not shown). The spindle 311 is split so that the lower portion 320 of the spindle rotates independently of the upper portion 321 of the spindle. Tension is transmitted from the upper portion 321 to the lower portion 320 by a coupling 322. The coupling 322 is at one end threaded to the lock nut 325 and serves to restrain the lower portion of the spindle 320 between a pair of thrust bearings 325, 326. The lock nut is threaded onto the bottom end of the upper spindle 321 and has a threaded exterior to engage the coupling 322.

The lower portion of the spindle 320 carries an integral flange 330 which is longitudinally trapped by the coupling but which rotates freely within it. Ball bearings 339 support the lower portion 320 within the coupling 322. The coupling arrangement allows the lower portion 320 to rotate independently of the upper portion 321. This arrangement minimises the rotation of the lower portion and minimises wear on the seals 331, preferably two in number, which seals prevent grease, water and mud from interfering with the operation of the pendulum arrangement 340.

As shown in FIGS. 15 and 16, the pendulum arrangement 340 comprises a mounting plate 341 which is attached to the shaft retainer 342 by a set screw 343. The mounting plate 341 also includes a central opening for slidably receiving the lower portion 320 of the spindle. The mounting plate 341 also receives and supports a mounting post 344 which in turn affixes to the pendulum backing plate 345. The backing plate 345 may attach to the post 344 by a fastener 346 or by any other convenient means. The backing plate 345 includes a generally hemispherical socket or recess 347 and removably receives a pivot plate 348. The pivot plate 348 affixes to the backing plate 345 and includes a central opening 349 which prevents the pendulum 350 from escaping. Together, the opening 347 in the backing plate 345 and the opening 349 in the pivot plate 348 permit the spherical end 351 to pivot about its centre 352. Thus, the backing plate 345 and the pivot plate 348 comprise a socket and together with the generally spherical end 351 of the pendulum 350 form a ball and socket joint.

The pendulum 350 further comprises an enlarged bulb 353 and a short shaft 354 which connects the bulb 353 to the spherical end or ball 351. A terminal end of the bulb 353 forms a conical point 355 which is capable of making an indentation or impression in the indent washer 356. The pendulum is thus very rigid axially, but free to swing. The indent washer 356 is retained in a known orientation by the indent washer mount plate 357 which is in turn restrained by a circumferential groove or slot 358 in the needle chamber 359. The needle chamber 359 comprises a generally cylindrical body which is affixable to the stub shaft or lower portion 320 by a socket screw 360. An opening 361 in the upper wall of the needle chamber 359 allows the mounting post 344 to slide without binding. Thus, when the lower portion of the spindle 320 is placed in tension, the replaceable indent washer 356 is drawn toward the point 355 of the pendulum 350. Thus, the impression made by the needle 355 makes an impression whose radial orientation on the indent washer 356 is indicative of the compass direction of inclination while the distance of the indent from the centre 362 of the disc is indicative of the degree of inclination.

It will be apparent that the invention has been described with reference to certain details of construction and that these details should be interpreted as examples and not as limitations to the scope of the invention.

What is claimed is:

1. An upper end for the inner tube of a core drill comprising:
   spindle supported within a cylindrical casing for reciprocating motion and biased, by a first spring in the casing, such that tension on the spindle overcomes the bias;
   a circumferential track surrounding a lower end of the spindle, the track facing upwardly;
   a impressionable washer surrounding spindle above the track and indexed to the casing;
   a ball in the track facing the washer, and
   a second spring which biases the track away from the washer but allows the impression to be made when the spindle is tensioned.

2. An upper end according to claim 1, wherein: a lower end of the spindle carries a pin which engages a pilot formed in the washer.

3. An upper end for the inner tube of a core drill comprising:
a spindle supported within a cylindrical casing for reciprocating motion and biased, by a spring in the casing, such that tension on the spindle overcomes the bias;
bushings at a lower end of the casing to support the spindle for reciprocating motion;
a circumferential track surrounding a lower end of the spindle, the track facing upwardly; an impressionable washer surrounding the spindle above the track and indexed to the casing, and
a ball in the track facing the washer and which, when the spindle is tensioned to overcome the bias of the spring, makes an impression on the washer.

4. An upper end according to claim 3, wherein:
a lower end of the spindle carries a pin which engages a pilot formed in the washer.

5. An upper end for the inner tube of a core drill comprising:
a spindle supported within a cylindrical casing for reciprocating motion and biased, by a spring the casing, such that tension on the spindle overcomes the bias;
a circumferential track surrounding a lower end of the spindle, the track facing upwardly;
an impressionable washer surrounding the spindle above the track and indexed to the casing, and
a ball in the track facing the washer and which, when the spindle is tensioned to overcome the bias of the spring, makes an impression on the washer,
and wherein:
the spindle is split and has upper and lower portions; the two portions are joined by a coupling;
the lower portion rotates independently of the upper portion; and the coupling transmitting tension from the upper portion to the lower portion.

6. An upper end according to claim 5, wherein:
the coupling supports thrust bearings which impose on an integral flange formed on the top of the lower portion.

7. An upper end according to claim 6, wherein:
a lower end of the casing supports seals between the spindle and the casing.

8. An upper end according to claim 7, wherein:
the coupling supports two thrust bearings, one located above the flange and one below the flange.

9. An upper end according to claim 5, wherein:
a lower end of the spindle carries a pin which engages a pilot formed in the washer.

10. An upper end for the inner tube of a core drill comprising:
a spindle supported within a cylindrical casing for reciprocating motion and biased, by a spring in the casing, such that tension on the spindle overcomes the bias;
a circumferential track surrounding a lower end of the spindle, the track facing upwardly;
an impressionable washer surrounding the spindle above the track and indexed to the casing, and
a ball in the track facing the washer and which, when the spindle is tensioned to overcome the bias of the spring, makes an impression on the washer,
and wherein:
the spring surrounds the spindle and extends between an upper extent of the casing and a nut which is threaded onto the spindle.

11. An upper end according to claim 10, wherein:
a lower end of the spindle carries a pin which engages a pilot formed in the washer.

12. A method for determining the orientation of a drilled core relative to a substrate comprising:
(i) drilling a core from a substrate with a core drill;
(ii) making orientation marking on a member located in an inner tube of a drill string during said drilling, the marking being made by a non-magnetic ball located in the inner tube and indication the lowest portion in the plane of the member when the core was separated from the substrate;
(iii) removing the inner tube and core from the drilled substrate;
(iv) relating the orientation marking to the orientation of the core.

13. The method for determining the orientation of a drilled core relative to a substrate comprising:
(a) drilling a core from a substrate with a core drill;
(b) making an orientation marking on a member located in a inner tube of a drill sting during said drilling, the marking indicating the lowest portion in the plane of the member when the core was separated from the substrate;
(c) removing the inner tube and core from the drilled substrate;
(d) relating the orientation marking to the orientation of the core by:
(i) determining the angular orientation of the member relative to the inner tube;
(ii) observing the angular displacement of the marking relative to an index of the inner tube;
(iii) aligning the core to a known relationship with the inner tube; then
(iv) marking the coer in accordance with the observed angular displacement by transferring said angular displacement from the inner tube of the core by:
(v) using a spirit level to orientate the inner tube so that a known index is vertically upright;
(vi) using a second spirit level to vertically orient the member, the visual mark relating to the index mark; and
(vii) transferring the orientation of the orientation marking from the member to the core.

14. The method for determining the orientation of a drilled core relative to a substrate comprising:
(a) drilling a core from a substrate with a core drill;
(b) making an orientation marking on a member located in an inner tube of a drill string during said drilling, the marking indicating the lowest portion in the plane of the member when the core was separated from the substrate;
(c) removing the inner tube and core from the drilled substrate;
(d) relating the orientation marking to the orientation of the core by:
(i) aligning a laser beam with a first index formed on an exterior of the inner tube;
(ii) discharging the beam in the direction of and along the length of the core or core tube;
(iii) using the beam to mark the core or core tube with a second index mark which aligns with the first index mark; and
(iv) measuring core orientation information from the member; then transferring the information to the core using the second index mark as a reference.

15. The method for determining the orientation of a drilled core relative to a substrate according to claim 14, wherein aligning the laser beam with a first index comprises:

retaining a laser light source on a mount, the mount having a key, the first index corresponding to a keyway; and locating the key in the keyway.

16. An upper end for the inner tube of a core drill comprising:

a spindle supported within a cylindrical casing;

a shield adapted to engage a portion of the inner tube of the core drill;

a pendulum suspended within the shield and mechanically linked to the spindle, and an impressionable washer located below the pendulum and indexed to the casing, and wherein the spindle supported within the casing for reciprocating motion and biased, by a spring in a casing, such that tension on the spindle overcomes the bias and causes the pendulum to make an impression on the washer, and wherein:

the spindle is split and has upper and lower portions;

the two portions are joined by a coupling;

the lower portion rotates independently of the upper portion; and the coupling transmitting tension from the upper portion to the lower portion.

17. An upper end according to claim 16, wherein:

the pendulum comprises an axially rigid member, suspended by a ball and socket arrangement, the pendulum terminating in a point which can make an impression on the washer.

18. An upper end for the inner tube of a core drill according to claim 16, wherein a lower end of the casing surrounds and restrains a spindle coupling.

19. An upper end for the inner tube of a core drill according to claim 16, wherein the washer is retained within a needle chamber which is carried by the spindle.

20. An upper end for the inner tube of a core drill according to claim 16, wherein: the coupling supports thrust bearings which impose on an integral flange formed on the top of the lower portion.

21. An upper end according to claim 16, wherein:

a lower end of the casing supports seals between the spindle and the casing.

22. An upper end for the inner tube of a core drill according to claim 16, wherein the coupling supports two thrust bearings, one located above the flange and one below the flange.

23. An upper end according to claim 16, wherein:

the spring surrounds the spindle and extends between an upper extent of the casing and a nut which is threaded onto the spindle.

24. An upper end according to claim 16, wherein the coupling supports two thrust bearings, one located above the flange and one below the flange.

* * * * *